United States Patent [19]
Enomoto et al.

[11] Patent Number: 5,477,943
[45] Date of Patent: Dec. 26, 1995

[54] DISK BRAKE ASSEMBLY

[75] Inventors: Naoyasu Enomoto, Handa; Takeshi Nakane, Okazaki; Takayoshi Tsuzuki, Toyota; Kazuya Watanabe, Toyoto; Hiromu Kuromitsu, Chiryu; Matsuhisa Tsuruta, Toyota, all of Japan

[73] Assignee: Aisin Seiki Kabushiki Kaisha, Kariya, Japan

[21] Appl. No.: 150,861

[22] Filed: Nov. 12, 1993

[30] Foreign Application Priority Data

Nov. 13, 1992 [JP] Japan .................... 4-303506

[51] Int. Cl.$^6$ .................................... F16D 66/00
[52] U.S. Cl. .................. 188/1.11; 188/181 T; 303/112; 73/129
[58] Field of Search ................. 188/1.11, 181 T, 188/71.1, 72.2, 73.43, 73.44, 73.45, 156; 303/112; 73/121, 129

[56] References Cited

U.S. PATENT DOCUMENTS

| | | | |
|---|---|---|---|
| 4,716,994 | 1/1988 | Iwamoto | 188/1.11 |
| 5,279,394 | 1/1994 | Wollenweber et al. | 188/1.11 |

FOREIGN PATENT DOCUMENTS

| | | |
|---|---|---|
| 2284110 | 9/1975 | France . |
| 51-69680 | 6/1976 | Japan . |
| 61-275049 | 12/1986 | Japan . |
| 62-39739 | 2/1987 | Japan . |
| 62-38334 | 2/1987 | Japan . |
| 3-18267 | 8/1991 | Japan . |
| 4-134232 | 5/1992 | Japan . |
| 4-344437 | 12/1992 | Japan . |

*Primary Examiner*—Robert J. Oberleitner
*Assistant Examiner*—Chris Schwartz
*Attorney, Agent, or Firm*—Burns, Doane, Swecker & Mathis

[57] ABSTRACT

A disk brake assembly includes a disk rotor, a mounting member secured to a vehicle body and having a pair of opposed arms positioned at opposite sides of the disk rotor, respectively, a pair of confronting pads arranged on the arms, respectively, a caliper slidably supported on the mounting member so as to be movable in an axial direction generally parallel to an axis of the disk rotor, the caliper having a piston portion and a reaction portion disposed on opposite sides of the disk rotor and arranged to press the pads against opposite surfaces of the disk rotor for generating a braking force therebetween, a plate secured to one of the arms so as to be deformed upon generation of the braking force along a direction thereof, and a detecting device serving for measuring a deformation of the plate as a braking force and converting the deformation into an electric signal.

8 Claims, 7 Drawing Sheets

DISK BRAKE ASSEMBLY

BACKGROUND OF THE INVENTION

The present invention relates to a disk brake assembly, and in particular to a disk brake assembly having a device for measuring the braking force which is available upon an anti-skid operation.

In general, for an accurate braking control, the estimation of the condition of the road surface is required. This estimation can be established by recognizing the actual braking force during the braking operation. In Japanese Patent Laid-open Print No. Sho51(1983)–69680, a conventional disk brake assembly has a device for measuring the actual braking force. Generally speaking, in a disk brake assembly, a friction force generated between a pad and a disk rotor under rotation and an elastic member provided to a pad retaining member is expected to be varied depending on the frictional force. The resultant variation of the elastic member is measured by a strain gage, resulting in that the actual braking force is detected in the form of an electric current or signal.

However, the portion at which the strain gage is located or positioned near a center of the disk rotor, the strain gage Is subject to damage due to a high heat radiation from the disk rotor.

SUMMARY OF THE INVENTION

It is, therefore, a primary object of the present invention to provide a disk brake assembly without the foregoing drawback.

It is another object of the present invention to provide a disk brake assembly which is of excellent reliability in the detection of the braking force.

In order to attain the foregoing objects, a disk brake assembly includes a disk rotor, a mounting member secured to a vehicle body and having a pair of opposed arms positioned at opposite sides of the disk rotor, respectively, a pair of confronting pads arranged on the arms, respectively, a caliper slidably supported on the mounting member so as to be movable in an axial direction generally parallel to an axis of the disk rotor, the caliper having a piston portion and a reaction portion disposed on opposite sides of the disk rotor and arranged to press the pads against opposite surfaces of the disk rotor for generating a braking force therebetween, a plate secured to one of the arms so as to be deformed upon generation of the braking force along a direction thereof, and a detecting device serving for measuring a deformation of the plate as a braking force and converting the deformation into an electric signal.

BRIEF DESCRIPTION OF THE DRAWINGS

The above and other objects, features and advantages of the present invention will be more apparent and more readily appreciated from the following detailed description of preferred exemplarily embodiment of the present invention, taken in connection with the accompanying drawings, in which.

DESCRIPTION OF THE PREFERRED EMBODIMENT

An embodiment of the present invention will be described hereinunder in detail with reference to the accompanying drawings.

Figure 1:
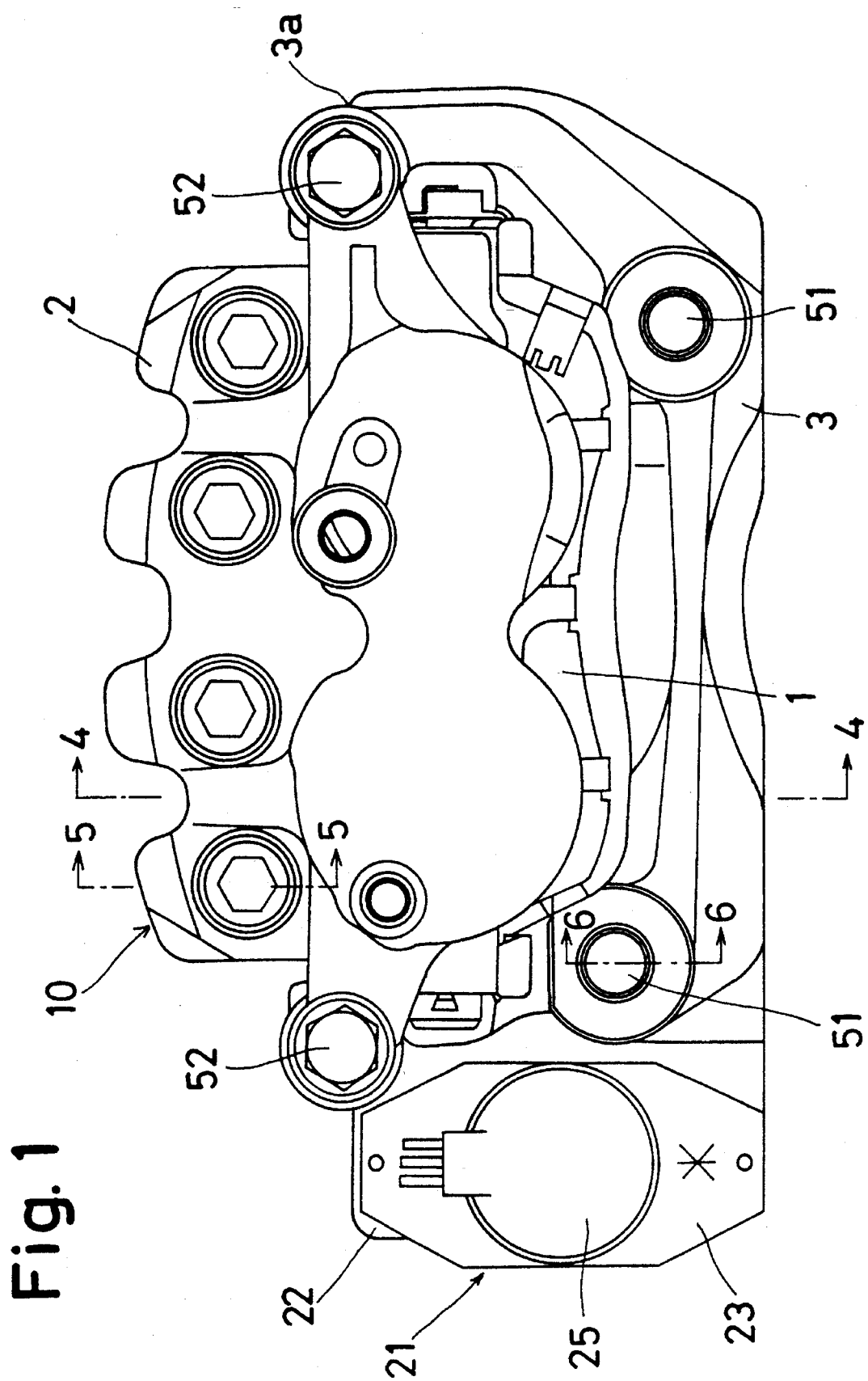
FIG. 1 is a back side view of a disk brake assembly according to the present invention.
Figure 2:
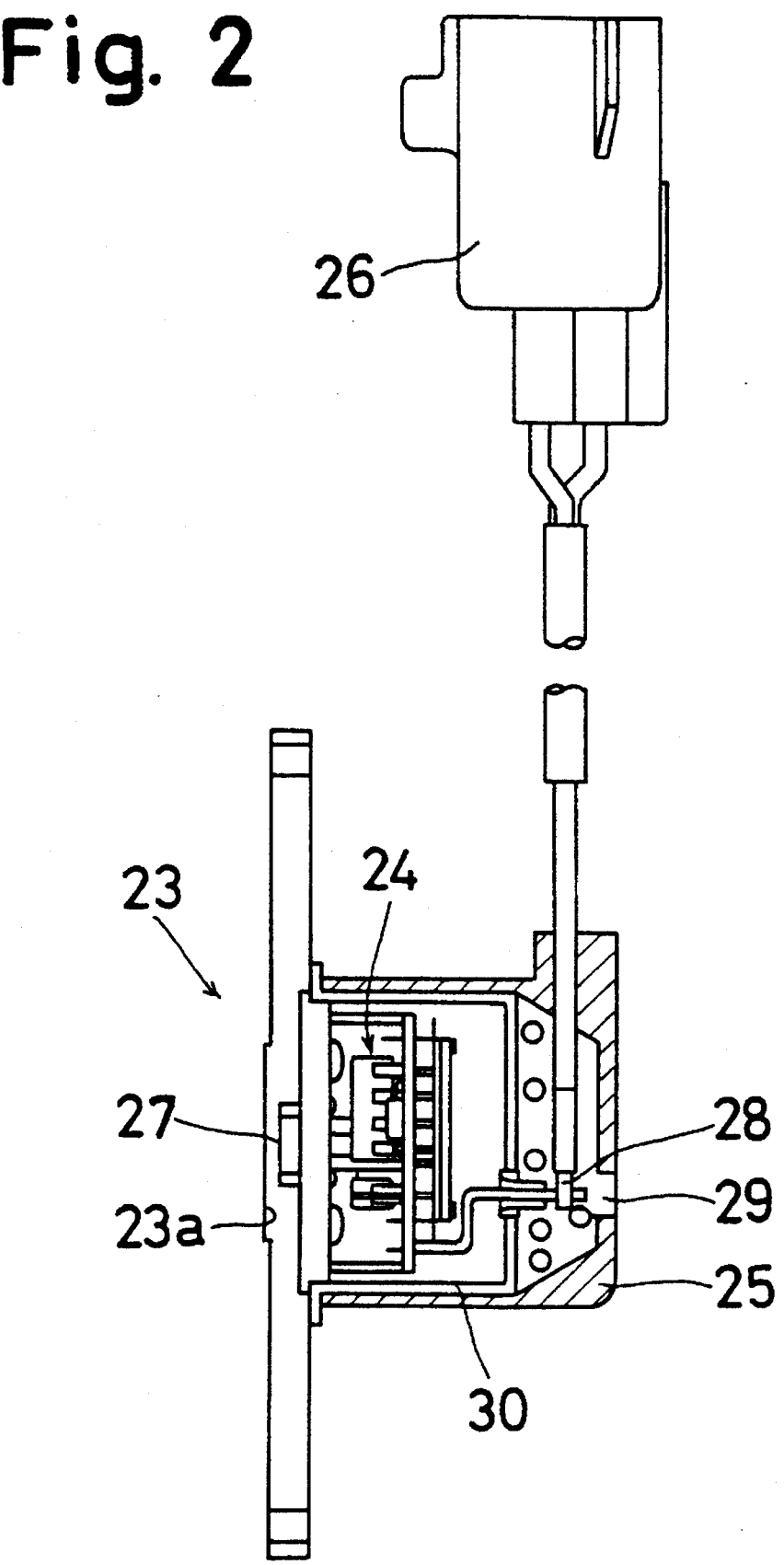
FIG. 2 is a cross-sectional view of a detecting device which is a principal part of the preent invention.
Figure 3:
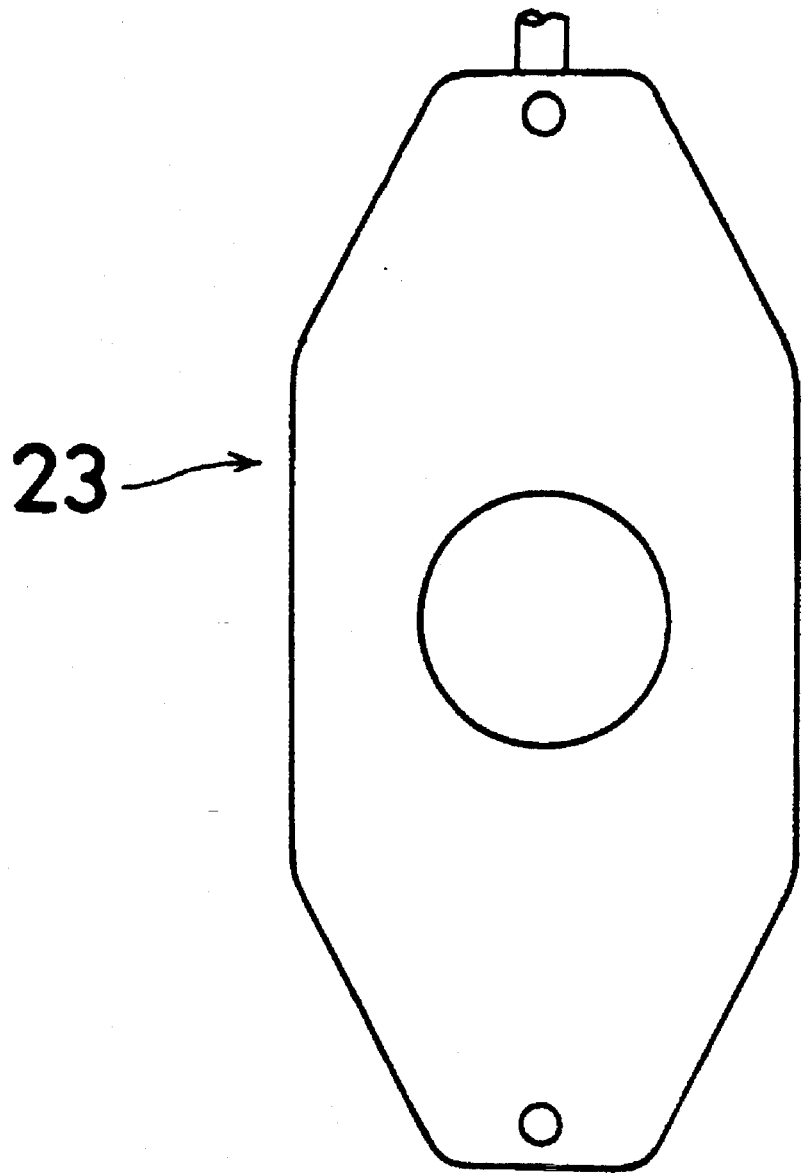
FIG. 3 is a plane view of a detection member.
Figure 4:
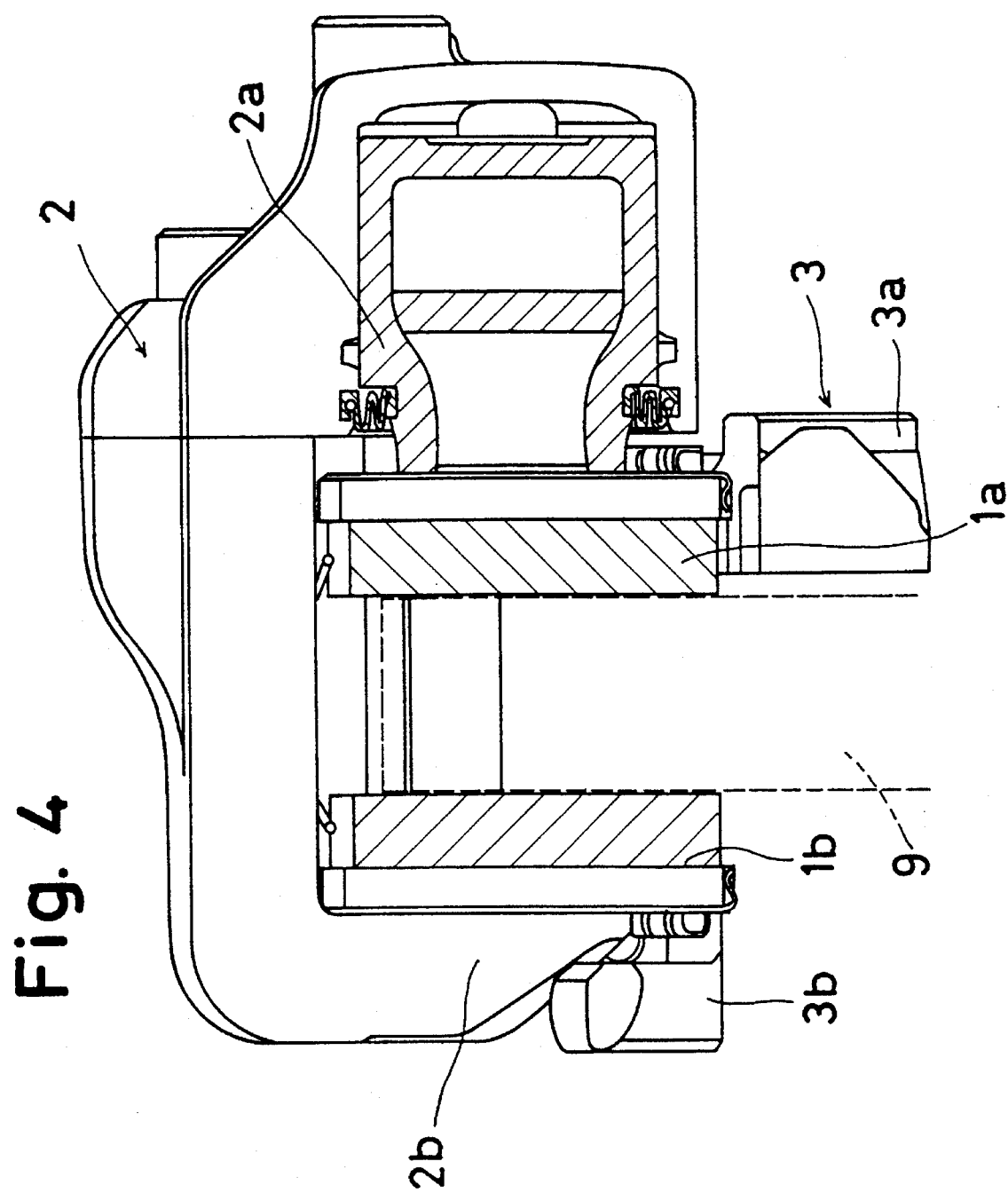
FIG. 4 is a cross-sectional view taken along line 4—4 in FIG. 1.
Figure 5:
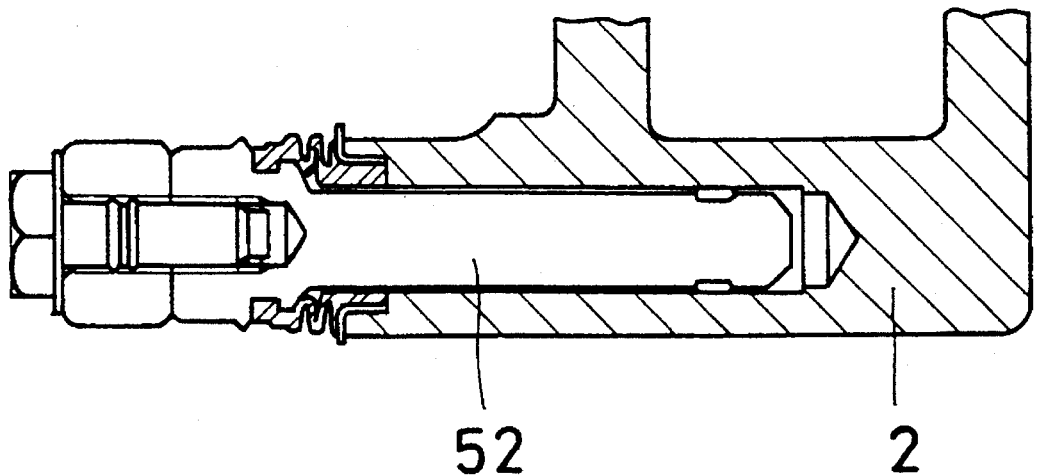
FIG. 5 is a cross-sectional view taken along line 5—5 in FIG. 1.
Figure 6:
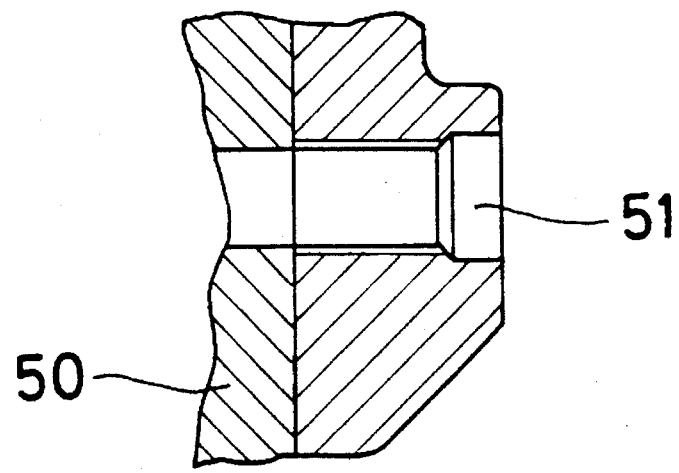
FIG. 6 is a cross-sectional view taken along line 6—6 in FIG. 1.
Figure 7:
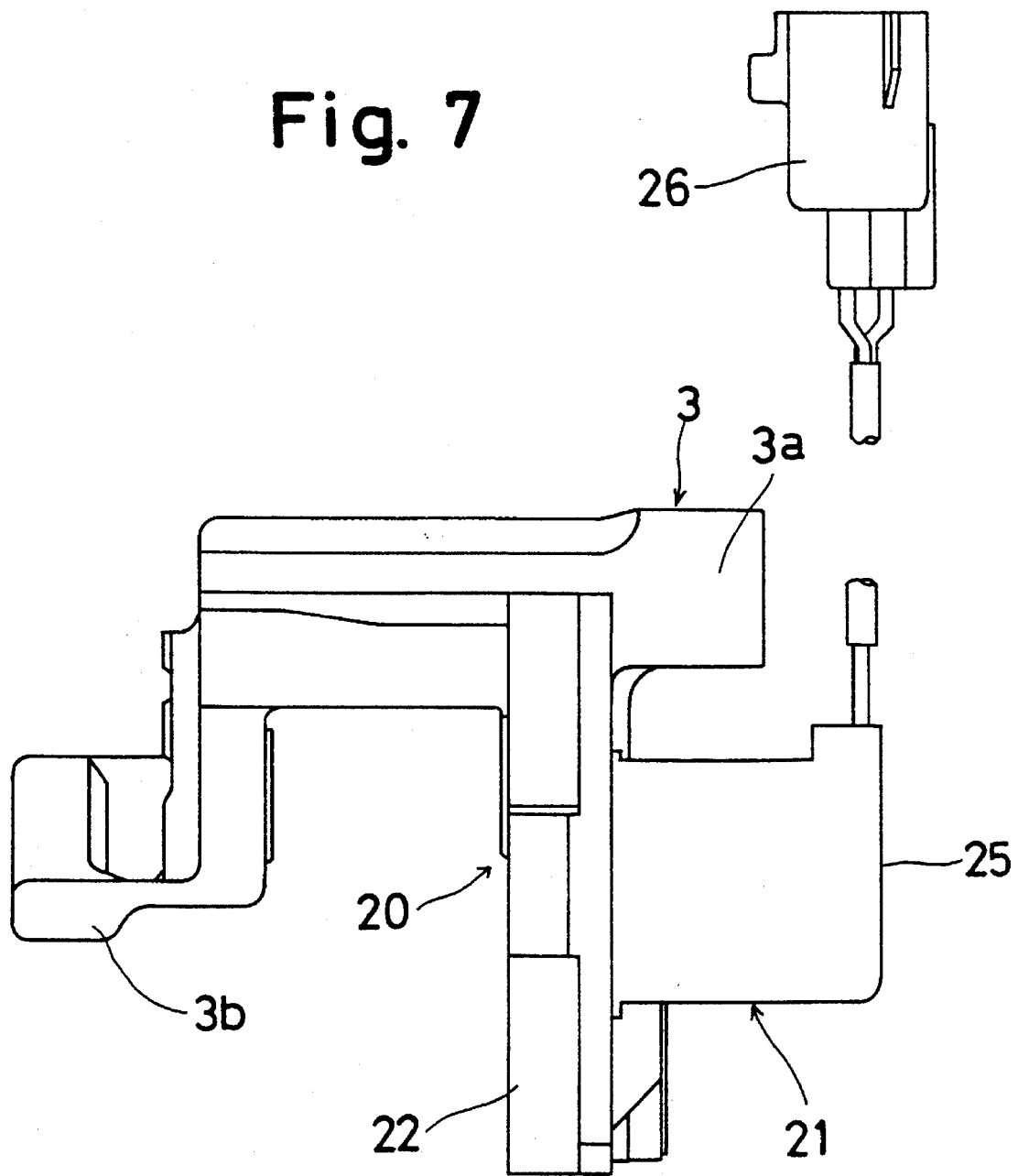
FIG. 7 is a cross-sectional view showing how a detecting device is connected to a mounting member.
Figure 8:
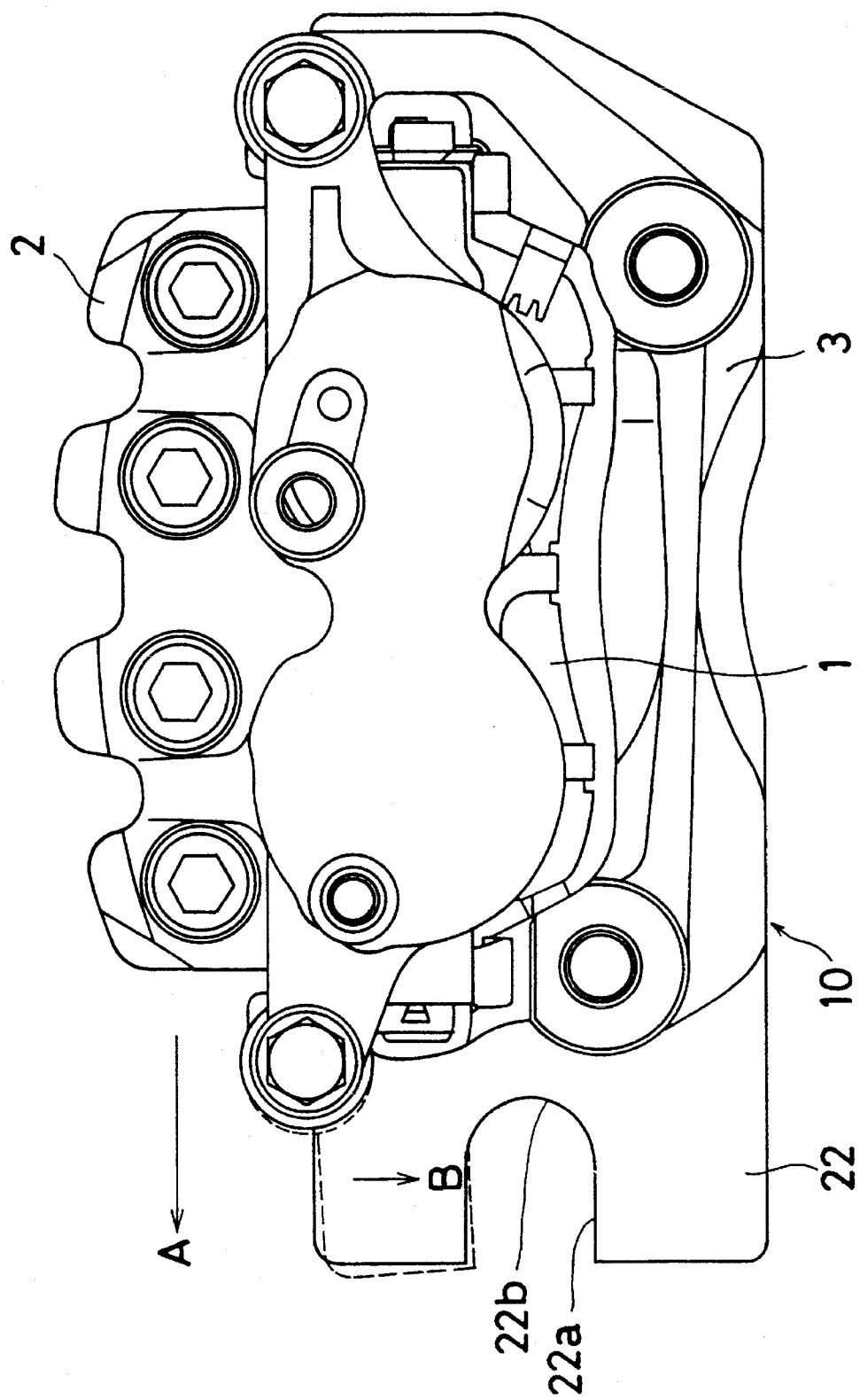
FIG. 8 is a view similar to FIG. 1 but fails to show a detecting device.

Referring FIGS. 1 through 8, a disk brake assembly 10 includes a disk rotor 9 which is, as well known, expected to rotate together with a road wheel (not shown). A mounting member 3 is secured to a vehicle body 50 via a pair of spaced bolts 51. The mounting member 3 has a pair of opposed arms 3a and 3b which are positioned at opposite sides of the disk rotor 9, respectively. On the arms 3a and 3b, a pair of pads 1a and 1b are arranged, respectively. A caliper 2 is supported on the mounting member 3 so as to be movable along a pair of pins 52 in an axial direction generally parallel to an axis of the disk rotor 9. The caliper 2 has a piston portion 2a and a reaction portion 2b which are disposed on opposite sides of the disk rotor 9, respectively, and is arranged to press the pads 1a and 1b against opposite surfaces of the disk rotor 9, respectively, for generating a braking force therebetween.

A plate 22 is secured to the arm 3a which supports the pad 1a. At a left end portion of the plate 22, there is formed a U-shaped cutout portion 22a which is open in the leftward direction. As well known, upon generation of the braking force whose direction is indicated by "A" which is established by pressing the pads 1a and 1b against the opposite surfaces of the disk rotor 9, respectively, the cutout portion 22a enables the plate 22 to deform in the direction of "B" and the resulting deformation is shown in the dotted line. This deformation due to the transmission of a load to the plate 22 which is given from the pad 1a to the mounting member 3. Upon deformation of the plate 22, a bottom 22b of the cutout portion 22a acts as a fulcrum and therefore according to the theory of leverage the leftmost side of the bracket 22 becomes the maximum in deformation. It is to be noted that since the disk brake assembly 10 is well known in construction and operation further explanation of the disk brake assembly 10 is omitted.

A detecting device 21, which constitutes a principal part of the present invention is constituted by the plate 22, a sensing plate 23, an amplifier circuit board 24, a cover member 25, and a connector 26. The sensing plate 23 is made of a metal and has a shallow circular projection 23a fitted in the cutout portion 22a of the plate 22. Within the sensing plate 23, there is provided a strain gage 27 so as to be coaxial with the shallow circular projection 23a. The sensing plate 23 is connected at its upper and lower portions to the left end of the plate 22 by welding.

For the protection of the strain gage 27 and the amplifier circuit board 24, a housing 30 is used and the housing 30 is covered with a cover member 25 which is of a rubber characteristic. The housing 30 is secured to the sensing plate 23 by bolt means (not shown). The strain gage 27 is in the form of a bridge circuit as well known and is expected to transform deformation into an electric signal or current. The resultant signal is amplified at the amplifier circuit board 24 and is fed to a controller (not shown). A connector 26 is used for supplying a current to the amplifier circuit board 24 and feeding the signal therefrom to the controller. A connection 28 between the amplifier circuit board 24 and the connector 26 by a synthetic resin.

Upon generation of the braking force, the left side of the plate 22 is brought into deformation to some extent and the resultant deformation is sensed or detected by the strain gage 27 and is converted into an electric current. The resultant current is amplified at the amplifier circuit board 24 and is fed to a controller (not shown) so as to be used as a signal for an anti-skid control operation.

In the foregoing structure, even if the mounting member 3 is brought into a vertical vibration due to a rough road surface, the detecting device moves together with the mounting member 3, so that the detecting device 21 is not affected. Since the strain gage 27 is incorporated within the housing 30, the strain gage 27 is prevented from being affected by heat at a high temperature generated when each of the pads 1a and 1b is pressed onto the corresponding surface of the disk rotor 9. The welding connection of the sensing plate 23 to the plate 22 increases, as-a-whole the thermal capacity of the sensing plate 23, which in turn serves to prevent a rapid wide-range temperature change. In addition, the housing 30 protects the strain gage 27 from foreign substance or water, which assures the reliability of the strain gage 27. Furthermore, the disk brake assembly according to the present invention can be produces simply by connecting the plate 24 on which are disposed the other elements constituting the detecting device 21 to the mounting member 3. This means that the existing mounting member can be used.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

What is claimed is:

1. A disk brake assembly comprising:
    a mounting member securable to a vehicle body and having a pair of opposed arms for being positioned at opposite sides of a disk rotor, respectively;
    a pair of confronting pads, each pad being arranged on the arms;
    a caliper slidably supported on the mounting member in an axial direction generally parallel to an axis of the disk rotor, the caliper having a piston portion and a reaction portion for being disposed on opposite sides of the disk rotor and arranged to press the pads against opposite surfaces of the disk rotor for generating a braking force therebetween;
    a plate secured to one of the arms for being deformed upon generation of the braking force, said plate being provided with a cutout portion which is open along a direction of the braking force; and
    a detecting device provided on the adjacent the cutout portion for measuring a deformation of the plate as the braking force and converting the deformation into an electric signal.

2. A disk brake assembly in accordance with claim 1, wherein the detecting device includes a metal member secured to the plate, a strain gage for detecting a deformation of the metal member, and an electric circuit for converting the deformation into an amplified electric current.

3. A disk brake assembly in accordance with claim 1, wherein the detecting device includes a strain gage, and including a housing in which the strain gage is disposed.

4. A disk brake assembly comprising:
    a disk rotor;
    a mounting member secured to a vehicle body via a pair of bolts and having a pair of opposed arms positioned at opposite sides of the disk rotor, respectively;
    a pair of confronting pads, each pad being arranged on one of the arms;
    a caliper slidably supported on the mounting member for movement in an axial direction generally parallel to an axis of the disk rotor, the caliper having a piston portion and a reaction portion disposed on opposite sides of the disk rotor and arranged to press the pads against opposite surfaces of the disk rotor for generating a braking force therebetween;
    a plate secured to one of the arms for being deformed upon generation of the braking force, said plate having a cutout portion which is open along a direction of the braking force; and
    a detecting device positioned adjacent the cutout portion of the plate for measuring a deformation of the plate as a braking force and converting the deformation into an electric signal.

5. A disk brake assembly in accordance with claim 2, wherein the metal member includes a circular projection which is received in the cutout portion of the plate.

6. A disk brake assembly in accordance with claim 5, wherein the strain gage and the circular projection are coaxial.

7. A disk brake assembly in accordance with claim 4, wherein the detecting device includes a metal sensing member secured to the plate and a strain gage for detecting deformation of the metal sensing member.

8. A disk brake assembly in accordance with claim 7, wherein the metal sensing member includes a circular projection received in the cutout of the plate, said circular projection and said strain gage being coaxial.

* * * * *